Patented Oct. 31, 1944

2,361,793

UNITED STATES PATENT OFFICE 2,361,793

PRODUCTION OF BLOWN FATTY MATERIALS

Ralph E. Porter, East Orange, and Jacob Wolfson, Newark, N. J., assignors to National Oil Products Company, Harrison, N. J., a corporation of New Jersey No Drawing. Application May 11, 1940, Serial No. 334,652

5 Claims. (Cl. 260—406)

This invention relates to the manufacture of novel blown oil compositions, more particularly to the manufacture of blown oils which may be used as substitutes for chamois moellon in the preparation of compositions suitable for fat-liquoring leather.

As is well known, chamois moellon is a highly valuable product and is used extensively in the manufacture of compositions for fat-liquoring leather. Chamois moellon is ordinarily obtained as a by-product from oil tanning of sheep skins. In this tanning process sheep skins are impregnated with an oil such as cod oil and permitted to hang in a humid atmosphere; after the skins have become suitably tanned, the excess oil is pressed therefrom, which oil constitutes the chamois moellon. The quality of the chamois moellon thus produced may vary widely depending upon the character of the oil employed and upon the conditions under which the tanning is carried out; in many cases the moellon produced is entirely unfit for the preparation of fat liquors. Furthermore, since the chamois moellon is a by-product of the tanning of sheep skins, the supply of the chamois moellon is dependent upon the amount of sheep skins tanned, and thus may vary according to the output of the tanneries. However, in spite of the disadvantages presented in obtaining a satisfactory and dependable supply of chamois moellon, no synthetic method of producing an oil similar to chamois moellon has been developed.

It is also well known that blown non-drying and semi-drying oils are extensively employed in treating fibrous materials such as textiles, leather, paper, etc. While such blown oils have found a wide range of useful application in this field, it would be highly desirable to produce blown products having higher hydroxyl contents than ordinary blown oils in order to increase the hydrophilic properties of these oils. As yet no commercially satisfactory method for producing blown oils of greatly increased hydroxyl content has been devised.

It has been proposed to treat fish or vegetable oils by blowing them with moist air or a mixture of air and steam at temperatures substantially above 100° C. While the products obtained in accordance with these processes may have certain valuable properties, the blown oils thus obtained are completely unsuitable for use as substitutes for chamois moellon; furthermore, the high temperatures employed cause extensive polymerization and thus make these oils unfit for many purposes.

It is an object of this invention to provide a process for producing products which may be used in place of chamois moellon.

Another object of this invention is to produce novel blown oils capable of a wide variety of uses.

A more specific object of this invention is to provide a simple and economical process for the preparation of fat liquors from readily available oils.

We have found that valuable products suitable for use in preparing compositions for treating fibrous materials may be prepared by blowing a non-drying or semi-drying unsaturated fatty material with air or other oxygen-containing gas at a temperature below about 100° C. and in the presence of water. The temperature preferably employed in the practice of our invention is between about 30° and about 50° C., since at these temperatures optimum results are obtained. The process of our invention may be carried out by passing air or other oxygen-containing gas substantially saturated with water vapor at the blowing temperature through a body of the unsaturated fatty material at a temperature below about 100° C. However, we have found that our process is most advantageously performed by adding a suitable amount of water to the unsaturated fatty material, and then passing the oxygen-containing gas through the mixture of oil and water at a temperature below about 100° C., additional water being added during the course of the blowing, if necessary. The preferred embodiment of our invention involves mixing an unsaturated fatty material of the aforementioned type with a suitable amount of water and a small amount of an oil-soluble emulsifying agent such as a sulfonated oil, and then blowing the mixture with air at a temperature between about 30° and about 50° C., since under these conditions of operation uniform blowing of the oil is facilitated and products of a high degree of excellence are obtained. The blown products of our invention have high acetyl values, indicating that their hydroxyl contents are considerably higher than those of the original oils or of blown fatty materials heretofore produced; these products are thus more hydrophilic than ordinary blown fatty materials. The blown oils resulting from the practice of our invention possess the important property of being highly efficient substitutes for chamois moellon, and may be compounded with finished or unfinished sulfonated oils to yield excellent fat liquors. Furthermore, all the blown products of our invention may be employed for uses to which blown fatty materials are adapted, and are particularly useful in processes involving the use of aqueous compositions containing blown fatty materials, their improved hydrophilic properties making them superior to ordinary blown fatty materials.

In carrying out the process of our invention any non-drying or semi-drying unsaturated fatty material may be treated to produce the desired products; thus, for example, non-drying and semi-drying oils exemplified by unsaturated fish oils such as cod oil, menhaden oil, herring oil, and whale oil may be treated, as well as unsaturated non-drying and semi-drying vegetable oils such as teaseed oil, soy bean oil, peanut oil, corn oil, cottonseed oil, etc. However, other unsaturated fatty materials such as unsaturated fatty acids, alcohols, amides, esters, etc., may also be blown in accordance with our invention so as to yield valuable products; thus the term "unsaturated fatty material" is used throughout the specification and claims to include any body of fatty origin having non-drying or semi-drying properties and one or more unsaturated linkages therein or mixtures of such bodies. Since unsaturated fatty oils, particularly unsaturated fish oils, are inexpensive and readily available, and since the blown products obtained from such semi-drying oils have been found to be highly effective substitutes for chamois moellon, we prefer to use such oils as starting materials.

The blowing treatment of our invention is most advantageously carried out by mixing a suitable amount of water with the unsaturated fatty oil to be treated, and then passing air or other oxygen-containing gas through the oil at a temperature below about 100° C., preferably between about 30° and about 50° C. The amount of water mixed with the oil may vary somewhat; in general it may be said that the amount of water should be at least equivalent to that sufficient to saturate the air at the temperature of blowing, and that preferably an amount of water equivalent to between about 2% and about 15% of the weight of the oil is present during the blowing operation. The entire amount of water necessary for the practice of our invention may be added to the oil before contact with oxygen-containing gas; however, we prefer to continually renew the supply of water by the addition of suitable amounts thereof to the oil during blowing in order to insure an adequate supply. The oxygen-containing gas employed for blowing may be air, oxygen, ozone, or mixtures thereof. The temperature at which the blowing is carried out is extremely important and should be below about 100° C.; we prefer to work at temperatures between about 30° and about 50° C. because of the excellent results obtained. The time of blowing may vary widely depending upon the temperature employed and upon the degree of unsaturation of the oil; generally a time between about 10 and about 40 hours is suitable. The time of blowing may also be influenced by the pH value of the fatty material and it appears that by making the pH value alkaline, the blowing may be accelerated; however, the fatty material may be blown at any suitable pH value.

The preferred embodiment of our invention involves blowing a mixture of a semi-drying oil and water with an oxygen-containing gas in the presence of a small amount of an oil-soluble emulsifying agent such as sulfonated oils, fatty alkylolamides, oil-soluble soaps, wool grease, etc. The incorporation of these substances in the mixture being blown not only appears to facilitate the blowing operation by insuring uniform distribution of the water throughout the oil, but also permits the production of products highly suitable for use in preparing fat liquors.

The blowing treatment of our invention may also be performed by passing air or other oxygen-containing gas substantially saturated with water vapor at the temperature at which the blowing is to be carried out through the unsaturated fatty material. This method of operation yields valuable products, but is somewhat more difficult to carry out than the method hereinabove described; hence we prefer to employ the method set forth in detail above.

The blown products obtained in accordance with our invention have acetyl values ranging from about 40 to about 110; these values are much higher than the acetyl values of the original fatty materials or of ordinary blown fatty materials and indicate that our products are more highly hydroxylated than these latter substances. The viscosities of the blown products are higher than those of the starting materials, but their cloud points are usually lower than those of the unblown materials. While the viscosities of oils blown according to the present invention are higher than that of the corresponding starting oils, their viscosity is considerably lower than that of the same oils which have been blown for an equal period of time by ordinary air or equivalent oxygen-containing gases.

The blown oils produced in accordance with our invention may be used as substitutes for chamois moellon and thus may be applied to leather for lubricating purposes. They may also be combined with sulfonated oils, such as cod oil, in the usual manner to produce compositions suitable for fat-liquoring leather. The sulfonated oils with which our products are combined may be either finished sulfonated oils having their moisture contents and pH values already adjusted, or may be unfinished sulfonated oils. We have found that the most suitable fat liquors are obtained by mixing appropriate quantities of one of our blown oils with an unfinished sulfonated oil, and then adjusting the mixture with alkali to the desired pH value. Leather treated with the fat liquors prepared in accordance with our invention has been found to possess excellent softness and pliability and to be in every way comparable to leather treated with fat liquors containing natural chamois moellon.

The products of our invention may be used in the preparation of compositions suitable for treating fibrous materials other than leather, e. g., textiles, paper, etc. Their high degree of hydroxylation imparts to them marked hydrophilic properties and makes them highly suitable for the preparation of aqueous treating compositions. They may be blended with emulsifiers and dispersed in water to produce emulsions which may be applied to yarns, fibers, etc. They may be mixed with alkyl esters of higher fatty acids to produce highly valuable textile treating compositions. In general it may be said that our novel products may be used to advantage in cases where ordinary blown non-drying and semi-drying oils find application.

The following examples are illustrative of our invention; amounts are given in parts by weight.

*Example I*

93 parts of cod oil containing about 11% free fatty acid were mixed with 2 parts of water and 5 parts of sulfonated cod oil. The temperature of the mixture was then raised to about 40° C. and air was passed therethrough for 30 hours, 2 parts of water being added to the mixture every 5 hours. The resulting product was a heavy, reddish-brown liquid having an acetyl value of 40.3. Its viscosity was considerably higher than that of the cod oil. A mixture of 35 parts of this oil with 65 parts of sulfonated cod oil made an excellent fat liquor, yielding a leather softer than a similar fat liquor prepared from chamois moellon.

Example II 900 parts of cod oil containing about 11% free fatty acid and 100 parts of water were mixed, the temperature raised to about 40° C. and air passed therethrough for about 24 hours. The water was replenished throughout the process so as to maintain a moisture content in the mixture of between about 5% and about 10%. The resulting product was a heavy, reddish-brown oil having an acetyl value of 106.5. Its viscosity was considerably higher than that of the cod oil. A mixture of 45 parts of this oil with 55 parts of sulfonated cod oil made an excellent fat liquor.

Example III 90 parts of soya bean oil were mixed with 10 parts of water, the temperature of the mixture raised to about 40° C., and air passed therethrough for 30 hours. The water was replenished throughout the process so as to maintain a moisture content in the mixture of between about 5% and about 10%. The resulting product was a heavy, brown liquid, more viscous than the original oil.

Example IV 90 parts of herring oil were mixed with 10 parts of water and blown as described in Example III. The resulting product was a heavy, brown liquid, more viscous than the original oil.

Example V 90 parts of cottonseed oil were mixed with 10 parts of water and blown as described in Example III. The resulting product was a heavy, brown liquid, more viscous than the original oil.

Example VI 90 parts of teaseed oil were mixed with 10 parts of water and blown as described in Example III. The resulting product was a heavy, brown liquid, more viscous than the original oil.

Example VII 90 parts of red oil were mixed with 10 parts of water, the temperature of the mixture raised to 40° C. and air passed therethrough for 10 hours. The water was replenished throughout the process so as to maintain a moisture content in the mixture of between about 5% and about 10%. The resulting product was a heavy, brown liquid, more viscous than the original oil.

From the above description it will be evident that our invention provides a method for producing synthetic moellon having properties which make it equal or superior to chamois moellon now on the market. Our process will undoubtedly be of great value to those engaged in the manufacture of fat liquors, since it will enable them to carry out their operations without having to depend upon the sheep skin tanners for their supply of moellon. Furthermore, our novel products will find extensive use in the preparation of compositions suitable for treating textiles, paper and other fibrous materials.

Since certain changes in carrying out the above process and certain modifications in the products which embody the invention may be made without departing from its scope, it is intended that all matter contained in the above description shall be interpreted as illustrative and not in a limiting sense.

Having described our invention, what we claim as new and desire to secure by Letters Patent is:

1. A process for the production of highly hydroxylated blown fatty materials, which comprises blowing an unsaturated fatty material selected from the group consisting of non-drying and semi-drying fatty materials and water with an oxygen-containing gas at a temperature between about 30° and about 50° C. in the presence of a small amount of an oil-soluble emulsifying agent.

2. A process for the production of a highly hydroxylated blown oil, which comprises blowing a mixture of a semi-drying oil and water with an oxygen-containing gas at a temperature between about 30° and about 50° C. and in the presence of an oil-soluble emulsifying agent.

3. A process for the production of a highly hydroxylated blown oil, which comprises blowing a semi-drying oil, water and an oil-soluble emulsifying agent with an oxygen-containing gas at a temperature below 100° C.

4. A process for the production of a highly hydroxylated blown oil, which comprises blowing a mixture of a semi-drying oil and water with an oxygen-containing gas at a temperature between about 30° and about 50° C. and in the presence of wool grease.

5. A process for the production of a highly hydroxylated blown oil, which comprises blowing a mixture of an unsaturated fish oil, water and an oil-soluble emulsifying agent with an oxygen-containing gas at a temperature between about 30° C. and about 50° C.

RALPH E. PORTER.
JACOB WOLFSON.